Aug. 19, 1958    L. P. HOLLANDER    2,847,731
FLOOR MAT
Filed Dec. 23, 1954
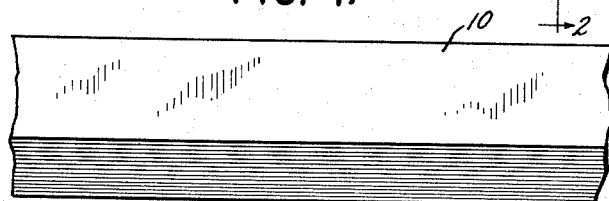
FIG. 1.
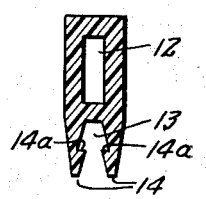
FIG. 2.
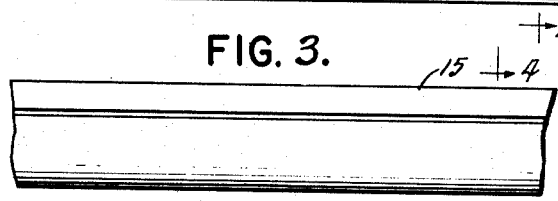
FIG. 3.
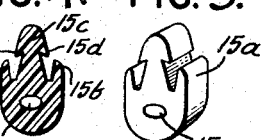
FIG. 4.   FIG. 5.
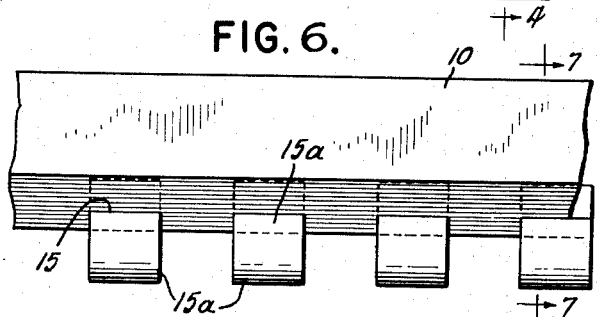
FIG. 6.
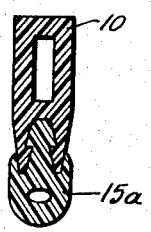
FIG. 7.
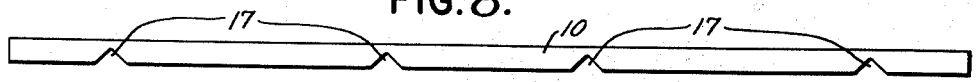
FIG. 8.
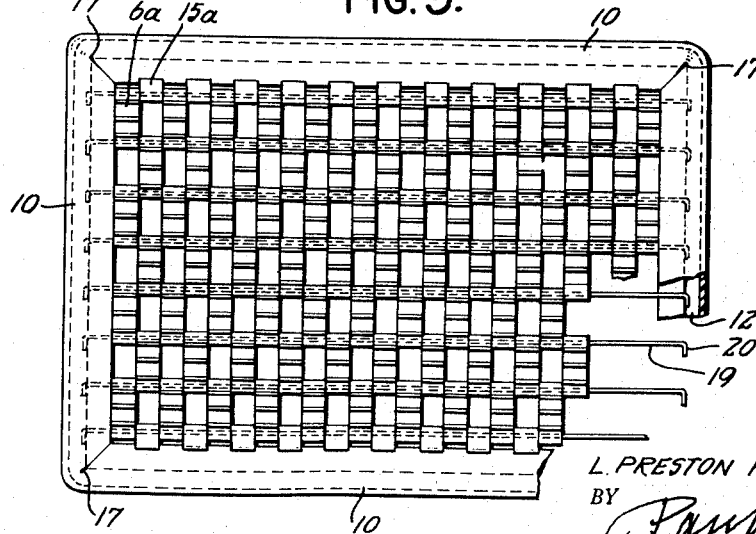
FIG. 9.
FIG. 5a
INVENTOR.
L. PRESTON HOLLANDER
BY
ATTORNEY

United States Patent Office 2,847,731
Patented Aug. 19, 1958

2,847,731

FLOOR MAT

L Preston Hollander, Patterson, N. Y., assignor to Pawling Rubber Corporation, Pawling, N. Y., a corporation of Delaware Application December 23, 1954, Serial No. 477,292

3 Claims. (Cl. 20—78.3)

The present invention relates to a nosing construction suitable for use as a peripheral margin of a floor mat and more particularly to a floor mat comprising a linked tread with a nosing of pressure-responsive resilient material forming the peripheral margin thereof.

Floor mats are well known comprising links of either hard or resilient material held together by linking means and having an outer border or peripheral margin of nosing formed from elements of pressure-responsive resilient or rubber-like materials. Generally, such elements are produced by extrusion. Heretofore, the practice has been to produce nosings for floor mats by cutting up suitable lengths of the material, mitering their ends to enable the pieces to be fitted and connected together into a rectangular nosing and cutting nose-connecting means into a pair of opposed sides to enable the nosing to be connected to a linked tread from which the mat is formed. The process was generally time consuming and required that the nosing be produced from extruded elements of two different widths, the wider element being used for the opposed sides into which nose-connecting means were cut. The cutting had to be precise so that the nose-connecting means would line up accurately with the links of the tread to which the nose-connecting means were attached. Thus, a great deal of care had to be taken to insure manufacturing precision, otherwise a small error in the spacing of a nose connector integral with the nosing would become magnified over a long length, whereby a nose connector might end up completely out of line with its corresponding link, thus resulting in the rejection of the mat. Because extruded nosing elements of two different widths were employed, it was also difficult to obtain good square corners, not only from the viewpoint of appearance but also from the viewpoint of lasting quality.

It is the object of the present invention to overcome the foregoing disadvantages and to provide a nosing for linked treads which in its very construction simplifies the making of peripheral margins whereby a mat of lasting quality can be provided.

Other objects of the invention will become apparent from the accompanying drawings wherein:

Fig. 1 depicts an extruded element of pressure-responsive resilient material employed in the production of the nosing provided by the invention;

Fig. 2 is a cross-section of the element of Fig. 1 taken along line 11—11;

Fig. 3 is an extruded element of a material similar to the element of Fig. 1 from which nose-connectors of the invention are produced;

Fig. 4 is a cross-section of the nose-connecting element of Fig. 3 taken along line 13—13;

Fig. 5 illustrates in three dimensions the nose connector of the invention produced from the element of Fig. 3;

Fig. 6 is a view showing in combination the nosing and the nose connector;

Fig. 7 is a cross-section of the combination of Fig. 6 taken through line 16—16;

Fig. 8 illustrates on a reduced scale the nosing of the invention ready for use in the production of a rectangular peripheral margin of a floor mat; and Fig. 9 shows a completed floor mat with a portion broken away, having a peripheral margin comprising the nosing of the invention.

In the preferred embodiment of the invention, an extruded element 10 (Fig. 1) of hollow construction is employed having the cross-section shown in Fig. 2 comprising a rectangular passageway 12 running therethrough near its outer marginal edge and a channel 13 also running therethrough near its inner marginal edge having integral with the walls thereof prong-like gripping means 14 provided with inwardly extending shoulders 14a adapted to form a strong dovetail-like joint with the nose connector to be described. The channel is designed to receive and detachably hold a nose connector 15a of the type shown in Fig. 15 produced from extruded element 15. The nose connector has a tongue 15c (see Fig. 4) adapted to conform to and be received snugly by channel 13 of the nosing and is provided with angular barb-like extensions 15d designed to form a dovetail-like joint with shoulders 14a of Fig. 2. By employing pressure-responsive yieldable material for the nosing and the connectors a relatively tight joint is obtained. The nose connector is preferably provided with wings 15b projecting from the main body of the connector near the root of tongue 15c which are adapted yieldably to grip the side walls of the inner margin of the nosing as shown in Figs. 6 and 7. Thus, in effect the connector grips the nosing and the nosing grips the connector. The end of the nose connector opposite the tongue is provided with an oval passageway 15e through which link-connecting rods 19 pass. The nose connector cooperates with the nosing to produce a relatively strong mechanical joint between the nosing and the linked tread of the mat.

Unlike prior art nosings, it is preferred that the nosing of the invention be prepared from one length of nosing material, preferably extruded rubber or the pressure-responsive resilient material, as shown on a reduced scale in Fig. 8. Right angle joints are produced by cutting right angles 17 from the inner marginal edge of the nosing leaving the outer margin unsevered. The partially severed element is then bent in its plane to close each of the severed portions to produce the strong right angle joints 17 shown in Fig. 9 comprising a continuous element about the outer margin of the four corners. The nosing produced in this manner behaves like a unitary structure and is much stronger and more uniform than prior art nosings having mitered corners. After the nosing material has been cut and made ready for forming into a nosing for a mat, nose connectors 15a are grippingly attached to opposed sides as shown in Fig. 9 and attachment of the assembly to the linked tread comprising links 6a effected by means of link-supporting rods 19 through circular passageway 15e of the nose connector. The rods are held in link-supporting positions by means of their bent ends 20 in rectangular passageway 12. For rubber-like nosings, the rectangular passageway is also adapted to receive, if desired, stiffening means such as a strip of metal or other reinforcing element. The link 6a is shown in Fig. 5a as having rod-receiving apertures 8 near opposite ends and ribs 7 extending transversely therefrom.

Thus, the invention provides in combination a nosing and nose connectors suitable for use in forming the peripheral margin of a mat comprised of a linked tread. The nosing, which has inner and outer marginal edges, is characterized at the region of the inner marginal edge by gripping means for detachably gripping each of said nose connectors having at one end means adapted to be gripped by nosing and at the other end means to effect engagement thereof with the linked tread. The nose connector is also characterized by means adapted to grip the sides of the inner marginal edge of the nosing whereby a relatively strong mechanical joint is effected between the nosing and the linked tread.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A mechanical joint of pressure-responsive rubber or like material comprising in combination a nosing and a nose connector of said material in dove-tail like connection, the nosing forming one side of the joint having a channel whose walls define prong-like gripping means, the inner surface of said gripping means defining said channel having shoulders extending inwardly of said channel, the nose connector forming the other side of the joint comprising a tongue within said channel with barb-like extensions projecting substantially transversely from each side of the tongue, said barb-like extensions mechanically dove-tailing with the inwardly extending shoulders within the channel, said nose connector also having a pair of wings which grip the outer surface of said channel walls.

2. In a rectangular mat comprising a plurality of links interlaced by rods running transversely through apertures at the opposite ends of each of said links thereby forming a tread, said mat having a rectangular nosing of rubber and the like material forming the peripheral margin thereof and connected to the linked tread, the combination with the nosing at a pair of opposed sides of the periphery of a plurality of spaced nose connectors of material similar to the nosing connecting the linked tread to the nosing via joints between the nosing and the nosing connectors, the nosing forming one side of the joint having a channel whose walls define prong-like gripping means, the inner surface of said gripping means having shoulders extending inwardly of said channel, the nose connector forming the other side of the joint comprising a tongue within said channel with barb-like extensions projecting substantially transversely from each side of the tongue, said barb-like extensions mechanically dove-tailing with the inwardly extending shoulders within the channel, said nose connector also having a pair of wings which grip the outer surface of said channel walls.

3. The mat of claim 2, wherein the outer marginal edge of said nosing is continuous throughout the corners of the mat.

References Cited in the file of this patent

UNITED STATES PATENTS

| | | |
|---|---|---|
| 2,142,832 | Bell | Jan. 3, 1939 |
| 2,202,636 | McClelland | May 28, 1940 |
| 2,635,307 | Wood | Apr. 21, 1953 |
| 2,654,919 | Marvin | Oct. 13, 1953 |
| 2,655,239 | Kenlock | Oct. 13, 1953 |
| 2,693,009 | Beck | Nov. 2, 1954 |